United States Patent [19]
Shoemaker, Jr.

[11] 3,753,086
[45] Aug. 14, 1973

[54] METHOD AND APPARATUS FOR LOCATING AND MEASURING WAVE GUIDE DISCONTINUITIES

[76] Inventor: William B. Shoemaker, Jr., 1995 Valley Rd., Rt. 1, Box 361 K, Annapolis, Md. 21401

[22] Filed: Dec. 9, 1970

[21] Appl. No.: 96,512

[52] U.S. Cl. .................................. 324/52, 324/58 B
[51] Int. Cl. ........................ G01r 31/11, G01r 27/04
[58] Field of Search .............. 324/52, 58 B, 58.5 B, 324/121, 52; 343/17.7

[56] References Cited
UNITED STATES PATENTS

| | | | |
|---|---|---|---|
| 2,602,834 | 7/1952 | Leslie et al. | 324/52 |
| 3,031,643 | 4/1962 | Sheftelman | 324/52 X |
| 3,211,997 | 10/1965 | Hara | 324/52 |
| 3,403,333 | 9/1968 | Wooten | 324/121 R X |
| 2,760,156 | 8/1956 | Fletcher | 324/58 B |
| 3,244,978 | 4/1966 | Craven et al. | 324/58 B |
| 2,649,570 | 8/1953 | Radcliffe | 324/58 B X |

OTHER PUBLICATIONS

Stringfield et al., Fault Location Methods for Overhead Lines AIEE Transactions August 1957, pp. 518–530.

Halverson, Harley, "Testing Microwave Transmission Lines ...," Electronics June 30, 1961; pp. 86–88.

*Primary Examiner*—Gerard R. Strecker
*Attorney*—R. S. Sciascia and Q. E. Hodges

[57] ABSTRACT

An intermittent pulsed carrier signal having a frequency of approximately 10 gigahertz and on for approximately 10 nanoseconds duration is transmitted through a wave guide. Wave guide discontinuities reflect a portion of the incident pulse, and these reflected signals are detected and compared to the incident pulse relative to time and amplitude differences. The discontinuity point in the wave guide is then directly determined using time domain reflectometry, from the time interval for the signal to reach the discontinuity and for the reflected wave to travel back along the wave guide and be detected. As the intensity of the reflected signal is functionally related to the magnitude of the fault, a display of the reflected signal magnitude, compared to the incident signal magnitude, will indicate the magnitude of the wave guide discontinuity.

15 Claims, 2 Drawing Figures

INVENTOR.
WILLIAM B. SHOEMAKER, Jr.
BY D.E. Hodges
ATTORNEY

METHOD AND APPARATUS FOR LOCATING AND MEASURING WAVE GUIDE DISCONTINUITIES

The invention described herein may be manufactured and used by or for the Government of the United States of America for Governmental purposes without the payment of any royalties thereon or there for.

DESCRIPTION OF THE PRIOR ART

Prior art devices are available for measuring wave guide attenuation of the signal. These devices however are limited and do not have the capability for determining the magnitude or location of a wave guide discontinuity. The prior art also includes a complicated laboratory method involving insertion of a discontinuity bearing wave guide section into a short circuited line equipped with a calibrated traveling probe and plotting a series of observed probe voltages for a variety of shorting positions, then determining the reflection coefficient by computation. This procedure is unsuitable for field use because of its physical requirements and because of the skill required for completing this procedure, with the degree of accuracy required.

The prior art also includes apparatus and methods for determining the location and magnitude of wave guide discontinuities. In these types of apparatus, a signal source is frequency swept over a band of frequencies and this swept frequency signal source is transmitted to a wave guide. As the signal source frequency is constantly changing, a frequency difference will exist between the frequency of the transmitted or incident signal and the frequency of the signal reflected by discontinuity. This difference in frequency is detected as an amplitude and displayed relative to the time of transmission of the incident signal. By choosing a suitable zero time reference point and magnitude reference, the distance along the wave guide at which a fault exists may be determined and similarly the magnitude of the fault may be determined. The disadvantage existing with the frequency difference type of fault location and magnitude measurement is that the frequency difference is proportional to the distance between any two successive discontinuities. The resolving power of such an apparatus is therefore limited to the detection equipment and the ability of the detection equipment to recognize minute differences in frequency. Utilizing this procedure, shown in the prior art, produces usable results until the discontinuities within the wave guide produce signals having frequency differences which are too small to be detected by the frequency difference detecting equipment.

SUMMARY

This invention relates to a means for identifying, locating and accurately evaluating discontinuities occurring in a relatively long fabricated wave guide section. Wave guides are used to carry microwave signals because of their low losses, absence of leakage and good power handling ability. As the wave guide is a conduit for the traveling electromagnetic wave, any projection, irregularity, or discontinuity therein will cause a reflection of energy back towards the source. These discontinuities can occur at joints, where sections of wave guides are bolted together or by imperfections in the wave guide itself such as burrs, shavings, and dents.

The undesirable effects produced by these discontinuities are a loss of energy and phase distortion. When a discontinuity reduces the effectiveness of a microwave system, the section discontinuity must be quickly found and replaced.

This invention accomplishes the location of a discontinuity within a wave guide and provides an indication of the magnitude of discontinuity by transmitting a narrow pulse of energy through the wave guide and utilizing time domain reflectometry techniques to locate and define the discontinuity. This narrow pulse of energy is reflected by a discontinuity. The reflection is displayed or detected relative to the time of transmission of the incident pulse and relative to the magnitude of incident pulse energy.

A constant frequency signal source of approximately 10 gigahertz is pulse modulated at a periodic repetition rate of approximately 10 KHz., producing a pulse width of approximately 5 to 10 nanoseconds. The periodic wave form, over a period T has the wave form of the 10 gigahertz pulse carrier for a time interval $t$ within the period T. This signal is directed toward the wave guide and the signal reflected by the discontinuity is displayed on an oscilloscope or detected as an amplitude, relative to a reference amplitude and to a zero time reference. The zero time reference is established by a sample taken of the incident pulse. The time displacement between the appearance of the sample incident pulse and the reflected pulse corresponds to the distance along the wave guide at which the fault exists and the location of the fault. The magnitude difference between the reflected pulse and the incident pulse sample provides an indication of the fault magnitude.

Beside providing an efficient and reliable means for determining fault location and magnitude this invention provides a capability for detecting distinct discontinuities closely separated in distance and which cannot be detected as distinct and separate discontinuities by use of the frequency difference method. If two successive discontinuities exist closely separated and the frequency difference method discussed in the prior art paragraph above is used in an attempt to identify and locate these discontinuities, the frequency reflected from one discontinuity will differ only slightly from the frequency reflected from the second discontinuity. Frequency discriminating equipment, however, cannot precisely discriminate between signals having two difference frequencies as can amplitude discriminating equipment, detecting differences in time between the appearance of two distinct signals by amplitude recognition. In this invention, the signal reflected by a discontinuity will appear as an amplitude at a first point in time, and the signal reflected from a second discontinuity, close to the first discontinuity, will appear as an amplitude at a second point in time. Whereas resolving power of the frequency discriminating equipment used in the prior art is limited by its selectivity, in this invention the incident pulse can be narrowed to an extremely fine limit so the time duration of the pulse is less than the time for the pulse to travel between two narrowly separated discontinuities within a wave guide. With this condition the signals reflected from the narrowly separated discontinuities will appear as two separate and distinct amplitudes which can be separately measured whereas in the prior art the resolution of the device is dependent upon the frequency selectivity of the equipment. More importantly, in the prior art, the use of a swept frequency signal introduces an additional error because the wave propagation velocity of the incident and reflected signal along the wave guide is proportional to its frequency. The prior art devices must be adjusted for the differences in velocity propagation dependent upon frequency whereas in the instant invention, the signal frequency and the propagation velocity are constant and no adjustment need be made for the different propagation velocities of the signals emitted by the source and reflected from the discontinuity.

It is accordingly, one object of this invention to provide a system for identifying discontinuities within a wave guide.

It is a second object of this invention to locate the point in the wave guide bearing a discontinuity and magnitude of the discontinuity.

It is a third object of this invention to provide a method of quickly and easily determining the point in the wave guide having a discontinuity and the magnitude of that discontinuity.

It a fourth object of this invention to provide a means to quickly and easily identify and determine the magnitude of a discontinuity and the number of discontinuities existing in a wave guide.

It is a fifth object of this invention to provide a means for detecting successive discontinuities in a wave guide where the distance between each discontinuity is minute.

It is a sixth object of this invention to provide a means for determining the location and magnitude of discontinuity in wave guides using a constant frequency source and which does not require compensation for differences in the velocity of propagation within the wave guide.

DESCRIPTION OF THE PREFERRED EMBODIMENT

Figures 1, 2:
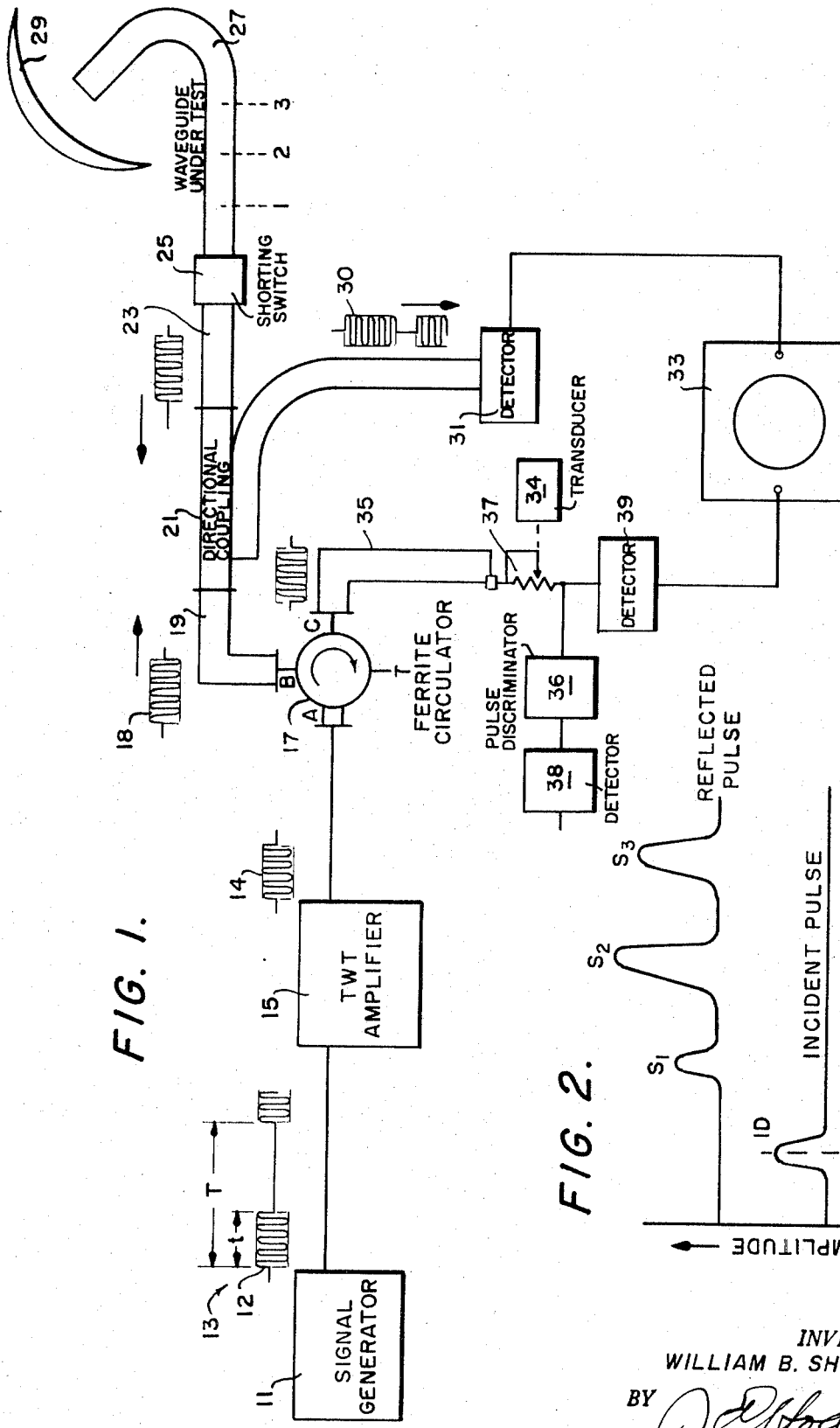
FIG. 1 shows the system for determining the presence of discontinuities in the wave guide and their location and magnitude determination.
FIG. 2 shows the display appearing on the oscilloscope shown in FIG. 1 when a wave guide is under test.

Referring to FIG. 1, wherein is shown the system for discontinuity fault location and magnitude measurements, generator 11 produces a periodic signal 13 having a period of approximately $10^{-4}$ Sec, and having the amplitude of carrier 12 for a time interval $t$ within period T. This signal may be produced by switching on a carrier signal having a frequency of approximately 10 gigahertz, for a time period $t$ and then switching off, it for a time interval $(T-t)$, the envelope of the signal during the time interval $t$ being a pulse. This may be specifically accomplished in any one of the number of suitable ways including an electronic switch controlling the output of an X-band signal generator or grid modulation of a traveling wave tube amplifier. The time interval $t$ is approximately 10 nanoseconds duration. The time interval $t$ of duration of the pulse wave form may be reduced to a time interval less than 10 nanoseconds to increase the resolving capability of the invention as will be explained in the following. The signal 13 is sent to a traveling wave tube amplifier 15 where it is amplified and appears as a signal 14 having a peak power of approximately 2 watts. A suitable traveling wave tube amplifier would be a Hewlett Packard Model HB495A. The output of the traveling wave tube amplifier is connected to port A of ferritte circulator 17 having circulation direction as shown by the arrow. A suitable ferritte circulator would be Model 8M-212 produced by Microwaves Associates. The ferritte circulator is connected at port B to wave guide 19. Directional coupling 21 is inserted between wave guide sections 19 and 23. Connected to wave guide 23 and the wave guide under test, 27, is wave guide shorting switch 25. The wave guide under test is usually a part of an operational unit, depicted in FIG. 1 as part of a radar antenna having a reflector 29. Detector 31 is connected to coupling 21 and the output of detector 31 is connected to the lower trace of an oscilloscope 33. Wave guide section 35 is connected to the ferritte circulator 17 at port C. Connected between wave guide section 35 and detector 39 is a wave guide variable precision attenuator 37. Attached to variable precision attenuator 37 is pulse discriminator 36, which can be preset to pass anyone or all of several separately appearing in time signals, (i.e., signals S1, or S2 or S3 shown in FIG. 2), to detector 38. Pulse discriminator 36 for this purpose may be a simple electronic clock tied to an "and" gate. The output of detector 38 may be connected to a computer (not shown) which records and processes the signal outputs of detector 38 according to a predetermined program. The output of attenuator 37 is connected in parallel to pulse discriminator 36 and to detector 39. The output of detector 39 is connected to the upper trace of oscilloscope 33. As explained in the following and as shown in FIG. 2, the upper trace of oscilloscope 33 will then display the signals reflected by the discontinuities S1, S2 and S3 within wave guide 27 while the lower trace of oscilloscope 33 will display a sample of the incident pulse signal ID derived through coupling 21 and detected by detector 31. The horizontal axis of the oscilloscope is calibrated in time and may be recalibrated in units of distance as the wave propagation velocity at the pulse carrier frequency is a known value.

The amplified signal 14 after entering the ferritte circulator 17 port A, leaves port B and is transmitted to the wave guide shorting switch 25. A sample 30 of the incident pulse 18 is obtained through directional coupling 21. This sample is detected by detector 31 and fed to the lower trace on oscilloscope 33 for use as a zero time reference, ID, shown in FIG. 2. The incident signal 18 is transmitted to or through wave guide shorting switch 25 to wave guide section 27 under test, depending on whether wave guide shorting switch 25 is closed or open.

In this system the wave propagation path from port A to port B of the circulator, through wave guide 19, directional coupling 21, through to its connection to detector 31 is equal in length to the wave propagation path from port A to port B of the circulator, through wave guide 19, through directional coupling 21, through wave guide 23, to shorting switch 25 and back through to circulator port B, through the ferritte circulator to port C, through wave guide 35 and variable attenuator 37, to the parallel connection of detector 39 and discriminator 36. These dimensions allow the shorting switch to be used as a time measuring reference corresponding to a zero time position of the incident pulse sample on the oscilloscope. In addition, the shorting switch when closed reflects substantially all of the incident energy and provides a suitable reference for use in determining the magnitude of the discontinuity within the wave guide 27.

OPERATION

Traveling wave tube amplifier 15 is adjusted to produce a signal 14 of approximately 2 watts peak power. The wave guide shorting switch 25 is opened permitting the display of return echoes S1, S2, and S3 on the upper trace of oscilloscope 33 corresponding to discontinuities 1, 2 and 3 respectively. As wave guide section 27 is depicted as having three discontinuities, 1, 2, and 3, the oscilloscope display will be as depicted in FIG. 2 where S1, S2 and S3 are the reflected signals resulting from the incident pulse being reflected by the discontinuities 1, 2 and 3 respectively, and where ID is the sample incident pulse derived from coupling 21 and appearing on the lower trace of the oscilloscope as a zero time reference. Pulse discriminator 36 is adjusted to pass only the signal reflected from discontinuity 1 and the amplitude on the oscilloscope of discontinuity 1 is recorded. The wave guide shorting switch is then closed and the variable precision attenuator is adjusted so that the signal reflected from wave guide shorting switch 25 and appearing on the oscilloscope is made equal in amplitude to the reflected signal S1. The variable precision attenuator as described may be calibrated in units of decibels or coupled with a position transducer 34 to directly provide upon adjustment, a signal corresponding to the ratio of the reflected signal amplitude from the shorting switch 25 to the signal reflected from the wave guide discontinuity 1, which is the ratio of incident power to power reflected by the discontinuity. This ratio in decibels is defined, as the apparent return loss ($L_{al}$) due to the discontinuity 1 within wave guide section 27. Similarly the ratio of the outputs of detector 38, when the shorting switch 25 is closed to the signal produced by detector 38 when the shorting switch is opened and corresponding to the power reflected from discontinuity 1 is equal to the apparent return loss $L_{al}$ expressed in units of decibels when the logarithm to the base 10 of the ratio is taken and multiplied by 20. When using the outputs of detector 38 to ascertain $L_a$, the value of the attenuator should be held to a constant value.

However, the power loss within wave guide section 27 due to the discontinuity 1 represents only a part of the total power loss within wave guide 27. The actual loss due to any discontinuity can be generally expressed as:

$$L_{Rx} = L_{ax} - 2A_x - 2 \sum_{k=1}^{k=x-1} L_{Tk} \quad (1)$$

where $L_{Rx}$ is the actual loss at a discontinuity of interest expressed in decibels; $L_{ax}$ is the apparent loss, expressed in decibels, at the discontinuity as previously described; A is the inherent attenuation of the wave guide from the shorting switch 25 to the point of the discontinuity of interest and expressed in decibels;

$$2 \sum_{k=1}^{k=x-1} L_{Tk}$$

is the summation of the transmission losses resulting from all other discontinuities existing between the shorting switch 25 and the discontinuity of interest and is expressed in decibels; and X is the number of the discontinuity, where each discontinuity is consecutively numbered starting with the number "1" given to the discontinuity closest to the wave guide shorting switch, the next successive discontinuity being numbered "2", the next "3", and so on as shown for wave guide 27 in FIG. 1.

The transmission loss $L_T$ for a particular discontinuity is the ratio of the incident power to the power transmitted past the discontinuity and can be derived from the actual return loss for the particular discontinuity from the following relationship, $$L_{T \text{ (in decibels)}} = 20 \log_{10} (1 - \text{antilog } L_R \text{ (expressed in decibels)}/20$$

The power transmitted past the discontinuity is equal to the power incident on the discontinuity minus the power reflected from the discontinuity.

In the case of a designed system the wave guide section 27 would have a known inherent attenuation, usually expressed in decibels per foot, relative to a signal frequency.

By processing the signals produced by detector 38 or the value of $L_a$ directly read from a position transducer attached to attenuator 37, according to the relationship of Equation 1, the magnitude of the actual loss from discontinuity 1 can be measured. The equation for the actual loss $L_{R1}$, at discontinuity 1, is then $$L_{R1} = L_{a1} - 2A_1 \text{ (where } X = 1\text{)}$$

As the upper and lower traces of the oscilloscope 33 are displayed relative to the same time axis, the displacement difference along horizontal time axis, between sample pulse ID and reflected pulse S1 is representative of the distance along the wave guide from wave guide shorting switch 21 where the fault 1 is located. The time displacement between sample incident pulse D and reflected pulse 1 can be read directly off the oscilloscope and can be easily converted to distance by multiplying the time by the wave propagation velocity at the frequency of the pulse. Alternatively as the propagation rate for wave guide 27 for the particular frequency of the pulse carrier is known, the horizontal axis can be calibrated in units of distance and the distance between the discontinuity and the wave guide shorting switch may be read directly off the oscilloscope. The value 2Ax can then easily be derived once this distance is known. Each consecutive discontinuity within wave guide 27 can then be measured using the method as described above. However, after the first discontinuity is measured, the succeeding discontinuity calculations require the inclusion of the transmission loss resulting from all discontinuities in wave guide between the discontinuity of interest being measured and the input to the wave guide. In the case of discontinuity number 2, in FIG. 1, Equation 1, would be as follows:

$$L_{R2} = L_{a2} - 2A_2 - L_{T1} \text{ (where } L_T \text{ is the transmission loss)}$$

Similarly in measuring discontinuity 3, the losses resulting from the discontinuities 1 and 2 within wave guide 27 and located between the input at discontinuity 3 would be inserted into the relationship of Equation 1 to determine the magnitude of the loss from discontinuities 3. The equation for the actual discontinuity loss at 3 would then be:

$$L_{R3} = L_{a3} - 2A_3 - (L_{T1} + L_{T2})$$

For the purpose of processing the signals produced by detector 38, a computer system (not shown) which separately stores the signals produced at detector 38 when the wave guide shorting switch is closed and when the wave guide shorting switch is open and then processes the signals produced according to the relationship shown in Equation 1 can be used. These computers are usually of the digital type and are well known and it is believed that there is no need to discuss these means for processing signals. Also a separate transducer 34 is not required to produce a signal directly corresponding to the ratio of the two signals expressed as the apparent loss in units of decibels but is included for purposes of clarity. In place of detector 38 the output of detector 39 may be connected directly to a computer through a pulse discriminator (to discriminate between the signals reflected from different discontinuities). The program of the computer may be preset to accept the output of detector 39 when the shorting switch is closed and to separately accept the output detector of 39 when the shorting switch is open and then upon command to combine the two signals to form the value $L_{ax}$ equal to $$20 \log_{10} \frac{\text{(voltage at output of 39 when shorting switch 25 closed)}}{\text{(voltage at output 39 when the shorting switch 25 is open)}}$$

Such a ratio would be the apparent return loss of the discontinuity expressed in decibels. This value could then be processed as the $L_{ax}$ term according to Equation 1, to ascertain the actual loss $L_{Rx}$.

Similarly, a computer system which receives the signal produced by a position transducer 34 attached to attenuator 37, could be used to process the signal according to Equation 1.

Similarly a pulse discrimination means (not shown) can be connected to receive the output of detector 39 and to select one of the pulses reflected from discontinuities 1, 2 or 3. This selected signal can then be inputed to a computer (not shown) along with the time reference signal ID from detector 31 and processed according to a predetermined program to produce a digital display of the distance from the wave guide to the discontinuity. This digital value can also be used within the program for processing the information according to Equation 1, including the inherent wave guide attenuation to the discontinuity of interest.

This invention will identify discontinuities within a wave guide, no matter how close to each other the discontinuities are located, as long as the time duration $t$ of the pulse wave train within the period T is less than the time required for the wave to travel between the two discontinuities. It can be seen therefore that this resolution of this device for identifying and locating discontinuities is solely dependent upon the degree to which the pulse wave train time duration T can be narrowed.

Obviously many modifications and variations of the present invention are possible in the light of the above teachings. It is therefore to be understood that within the scope of the appended claims the invention may be practiced otherwise than as specifically described.

What is claimed is:

1. A waveguide discontinuity measurement system for determining the magnitude and location of a single discontinuity of interest within a waveguide having a plurality of discontinuities, comprising:
   a waveguide having discontinuities;
   a pulse modulated signal source;
   means connecting said signal source to said waveguide;
   a waveguide shorting switch connected to said waveguide for reflecting a reference pulse;
   a variable attenuator having an input connected to receive the reflected signals from said waveguide shorting switch when said switch is closed or from a particular discontinuity in the waveguide when said waveguide shorting switch is open;
   means responsive to the adjustment of said variable attenuator for producing a signal representative of the ratio of the power incident on the waveguide to the power reflected by said particular discontinuity, when said variable attenuator is adjusted so the signal reflected from the waveguide shorting switch and appearing at the output of said adjusted attenuator is equal in amplitude to the signal reflected from said particular waveguide discontinuity and appearing at the output of said attenuator;
   said ratio being the apparent loss of the particular discontinuity of interest;
   means connected to said responsive means for processing said respresentative signal, according to the following relationship, $$L_{Rx} = L_{ax} - 2A_x - 2 \sum_{k=1}^{k=x-1} L_{Tk} \qquad (1)$$

where $L_{Rx}$ is the actual return loss at the particular discontinuity of interest;
$L_{ax}$ is the apparent loss;
$A_x$ is the inherent attenuation of the waveguide between the waveguide input and the particular discontinuity of interest;

$$2 \sum_{k=1}^{k=x-1} L_{Tk}$$

is the summation of the transmission losses from all other discontinuities existing between the shorting switch and the discontinuity of interest; and
$x$ is the number of the particular discontinuity of interest, where each discontinuity is consecutively numbered in the direction of incident wave propagation, starting with the number "1" given to the discontinuity closest to the waveguide shorting switch.

2. A waveguide discontinuity measurement system for determining the magnitude and location of a single discontinuity of interest within a waveguide having a plurality of discontinuities, comprising:
   a waveguide having discontinuities;
   a pulse modulated signal source;
   means connecting said signal source to said waveguide having the discontinuity;
   a waveguide shorting switch connected to said waveguide for reflecting a reference pulse;
   a variable attenuator having an input connected to receive the reflected signals from said waveguide shorting switch when said switch is closed or from a particular discontinuity in the waveguide when said waveguide shorting switch is open;

means responsive to the adjustment of said variable attenuator for producing a signal representative of the ratio of the power incident on the waveguide to the power reflected by said particular discontinuity, when said variable attenuator is adjusted so the signal reflected from the waveguide shorting switch and appearing at the output of said adjusted attenuator is equal in amplitude to the signal reflected from said particular waveguide discontinuity and appearing at the output of said attenuator;

said ratio being the apparent loss of the particular discontinuity of interest;

a first connecting waveguide;

a detector, connected to said signal source by said first connecting waveguide for receiving a sample of a signal, generated by said source, at the time said signal would be received at the output of said variable attenuator if said signal were reflected by said shorting switch; and means connected to receive the sample and reflected signals for comparing the time interval there between and indicating the location of the particular discontinuity.

3. The wave guide location and measurement system as recited in claim 2 wherein said pulse modulated signal has a periodic wave form, said wave form being a train of pulses of equal amplitude, and each pulse having a width $t$ within the period T of said constant frequency signal.

4. The wave guide discontinuity and measurement system of claim 1 wherein:

said connecting means comprises a ferrite circulator having a first port connected to said signal source and a second port successively displaced from said first port in the path of signal circulation through said ferrite circulator;

said ferrite circulator having a third port successive to said second port in the order of signal circulation through said ferrite circulator;

a directional coupler connecting said second port to said wave guide shorting switch; and including a first detector connected to said directional coupler for producing an incident pulse sample;

said variable attenuator being connected to receive the output of said circulator third port;

a second detector connected to the output of said attenuator; and said pulse reflected from said wave guide shorting switch when said switch is closed or from a wave guide discontinuity in the wave guide when said shorting switch is open passing through said directional coupler, entering said ferrite circulator at said second port and leaving said ferrite circulator at said third port and being passed through said variable signal attenuator to said second detector.

5. The wave guide fault and measuring system of claim 4 wherein the path from the first port of said ferrite circulator through the ferritte circulator to said second port and from said second port through the directional coupler to said first detector input is equal to the length of the path from the first port of said circulator through said circulator to said second port, through said directional coupler to said wave guide shorting switch, back through said directional coupler to said second port of said circulator, through said ferrite circulator from said second port to said third port and through said variable attenuator.

6. A wave guide fault location and measurement system of claim 2, wherein the time difference between the sample pulse and the reflected signal pulse is proportional to the distance between the wave guide shorting switch and the discontinuity within the wave guide.

7. A method for determining the magnitude and location of a particular discontinuity of interest within a waveguide having a plurality of discontinuities comprising the steps of:

directing a pulse modulated incident signal to the waveguide under test;

recording the amplitude of the portion of the incident signal reflected by a particular discontinuity of interest within the waveguide;

shorting the input to the waveguide under test;

recording the signal amplitude reflected from the shorted waveguide;

producing a second signal corresponding to the apparent loss, $L_{ax}$, being the ratio between said signal amplitude reflected from the shorted waveguide to the signal reflected from the waveguide discontinuity;

processing said signal in accordance with the relationship $$L_{Rx} = L_{ax} - 2Ax - 2\sum_{K=1}^{k=x-1} LTk:$$

where $L_{Rx}$ is the actual return loss at the particular discontinuity of interest;

$L_{ax}$ is the apparent loss;

$Ax$ is the inherent attenuation of the waveguide between the input and the particular discontinuity of interest;

$$2\sum_{k=1}^{k=x-1}$$

LTk is the summation of the transmission losses resulting from all other discontinuities existing between the shorting switch and the particular discontinuity of interest; and $x$ is the number of the particular discontinuity of interest, where each discontinuity is consecutively numbered in the direction of incident wave propagation, starting with the number "1" given to the discontinuity closest to the waveguide shorting switch.

8. A method for locating and measuring discontinuities in a wave guide, as recited in claim 7, wherein said producing step comprises the steps of:

attenuating the signal amplitude reflected from the shorted wave guide to the level of said signal reflected from said particular discontinuity; and deriving a signal, proportional to the apparent loss, and functionally related to the level of attenuation.

9. The method of claim 7 comprising the step of displaying the reflected signal juxtaposed in time with the incident signal, the displacement in time between the incident pulse and the reflected pulse being indicative of the distance from the wave guide short to the particular discontinuity within the wave guide.

10. A method for locating and measuring a discontinuity within a wave guide comprising the steps of:
generating a pulse modulator signal;
transmitting the signal to a wave guide;
generating a second signal representative of the amplitude of said signal when said signal reaches the wave guide;
generating a third signal representative of the amplitude of the signal reflected by a discontinuity of interest within the wave guide;
processing said second and third signal according to the relationship;

$$L_{Rx} = 20 \log_{10}\left(\frac{\text{2nd signal amplitude}}{\text{3rd signal amplitude}}\right) - 2Ax - 2\sum_{k=1}^{k=x-1} LTk$$

where A is the inherent attenuation of the wave guide;

$$\sum_{k=1}^{k=x-1} KTk$$

is the transmission loss resulting from all other discontinuities in the wave guide in the path of the reflected signal; and $x$ is the wave guide discontinuity of interest, where each discontinuity is consecutively numbered in the direction of incident wave propagation, starting with the number "1" given to the discontinuity closest to the wave guide shorting switch.

11. The method for locating and measuring a discontinuity within a wave guide, as recited in claim 10, further comprising:
the step of detecting the difference between the time for the incident signal to reach the wave guide and the time for the incident signal to reach the wave guide discontinuity to determine the location of the discontinuity.

12. A waveguide discontinuity detection apparatus for determining the magnitude and location of each discontinuity within the waveguide comprising:
a pulse modulated signal source;
a first detector;
a second detector;
a first wave propagation path connecting said signal source to one end of the waveguide under test and connecting said waveguide end to said first detector;
a second wave propagation path connecting said source to said second detector;
said first path being equal in length to said second path; and
each of said discontinuities being located at a distance from said detectors and proportional to the time difference between the appearance of a signal, generated by said source, at said second detector and the appearance of said generated signal, reflected by a discontinuity, at said first detector;
means connected to said first and second detector for comparing said time difference and indicating the location of each discontinuity relative to said waveguide end;
means for reflecting mounted on said waveguide end;
each of said waveguide discontinuities having a magnitude proportional to the ratio of a signal amplitude reflected from said means for reflecting to the signal amplitude reflected from each discontinuity; and
means connected to said first detector for comparing the signal reflected by the reflecting means and reflected by each discontinuity for indicating the magnitude of each discontinuity.

13. The apparatus of claim 12 wherein said signal source is of constant frequency having a pulse wave form output.

14. A waveguide discontinuity measurement system for determining the magnitude and location of a particular discontinuity of interest within a waveguide having a plurality of discontinuities, comprising:
a pulse modulated signal generator;
a first detector;
a first microwave transmission path connecting said generator to the waveguide, and said waveguide to said first detector for propagating reflecting pulses from said waveguide to said first detector;
said waveguide having a shorting means for reflecting substantially all of the incident pulse to said first detector;
means connected to said first detector for comparing the amplitude of said pulse reflected from said waveguide shorting switch and from a particular discontinuity within the waveguide, for determining the magnitude of said particular discontinuity.
a second detector;
a second path connecting said generator to said second detector;
said second path having a propagation length, with respect to the signal frequency, equal to the length of said first path from said generator to said shorting switch to said first detector;
means connected to said first and second detectors for comparing the time of arrival of a pulse transmitted from said generator through said second path to the time of arrival of said pulse propagated from said generator to said waveguide through said first path and reflected by said waveguide to said first detector for determining the location of said particular discontinuity.

15. The apparatus of claim 14 wherein said signal source is of constant frequency having a pulse waveform output.

* * * * *